Nov. 8, 1949     J. O. ELLIOTT     2,487,318
MAP WITH AREA POSITION INDICATOR

Filed Oct. 30, 1945     3 Sheets-Sheet 1

INVENTOR
John O. Elliott
BY Charles S. Evans
HIS ATTORNEY

Nov. 8, 1949 J. O. ELLIOTT 2,487,318
MAP WITH AREA POSITION INDICATOR
Filed Oct. 30, 1945 3 Sheets-Sheet 2

INVENTOR
John O. Elliott
BY Charles S. Evans
HIS ATTORNEY

INVENTOR.
John O. Elliott
BY Charles S. Evans
HIS ATTORNEY

Patented Nov. 8, 1949

2,487,318

UNITED STATES PATENT OFFICE 2,487,318

MAP WITH AREA POSITION INDICATOR

John O. Elliott, San Francisco, Calif.

Application October 30, 1945, Serial No. 625,614

7 Claims. (Cl. 177—311)

My invention relates to a map or guide for indicating the location of desired points within selected areas.

It is among the objects of my invention to provide a guide map in which an area, within which a selected point is located, may be readily found and dsplayed independently of other portions of the map.

Another object is to provide a map having coin controlled means for selectively illuminating limited areas of the map occupying positions locatable with respect to the top, bottom and sides of the map.

Another object is to provide a map having means for selectively illuminating limited areas thereof and provided with selector means for controlling the illuminating means.

Another object is to provide a map having an index on which identifiable locations are listed with respect to their respective positions in rows and columns of unitary areas extending from side to side and from top to bottom of the map, and also having means for selectively illuminating the areas and for indicating which area is to be illuminated.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

In terms of broad inclusion, the map of my invention comprises a plat showing identifiable locations within prescribed boundaries of a city or other geographical locality. The plat comprises a plurality of rows and columns of unitary areas each showing a limited portion of the plat and the identifiable locations therein. Lighting elements positioned for separately illuminating the unitary areas are energized through suitable selectors operable to selectively close a circuit through a selected lighting element, independently of the other lighting elements, for displaying the unitary area in which a desired point is located. An index of identifiable points, located with respect to the positions of the various unitary areas in the rows and columns, provides means for determining what area should be illuminated to display a desired location; and indicator lights are provided for indicating a selected row and column. The selectors are operated manually to effect electrical connection to the desired area of the plat; and coin operated means operate to control the supply of current to the illuminating means.

In terms of greater detail, the map of my invention comprises a plat 1 showing locations within desired geographic boundaries, as for example all or a portion of a city. If desired, the plat may be drawn, printed or otherwise applied to glass or plastic material, which may be either transparent or translucent. Preferably the plat is printed upon a sheet of paper which is laid between inner and outer facing plates 2 of glass or plastic. If desired, the inner or backing plate may be omitted. The plat is of a character such that it may be illuminated by light transmitted through the plat. The delineations of the plat are of a character such as to be readily seen and understood when illuminated from in back of the map. In some cases it may be desirable to use lines and characters which will normally blend with or be masked by the surface finish of the plat or the outer facing plate 2 thereof, but which will be thrown into sharp relief by light transmitted through the map from in back thereof.

Figure 1:
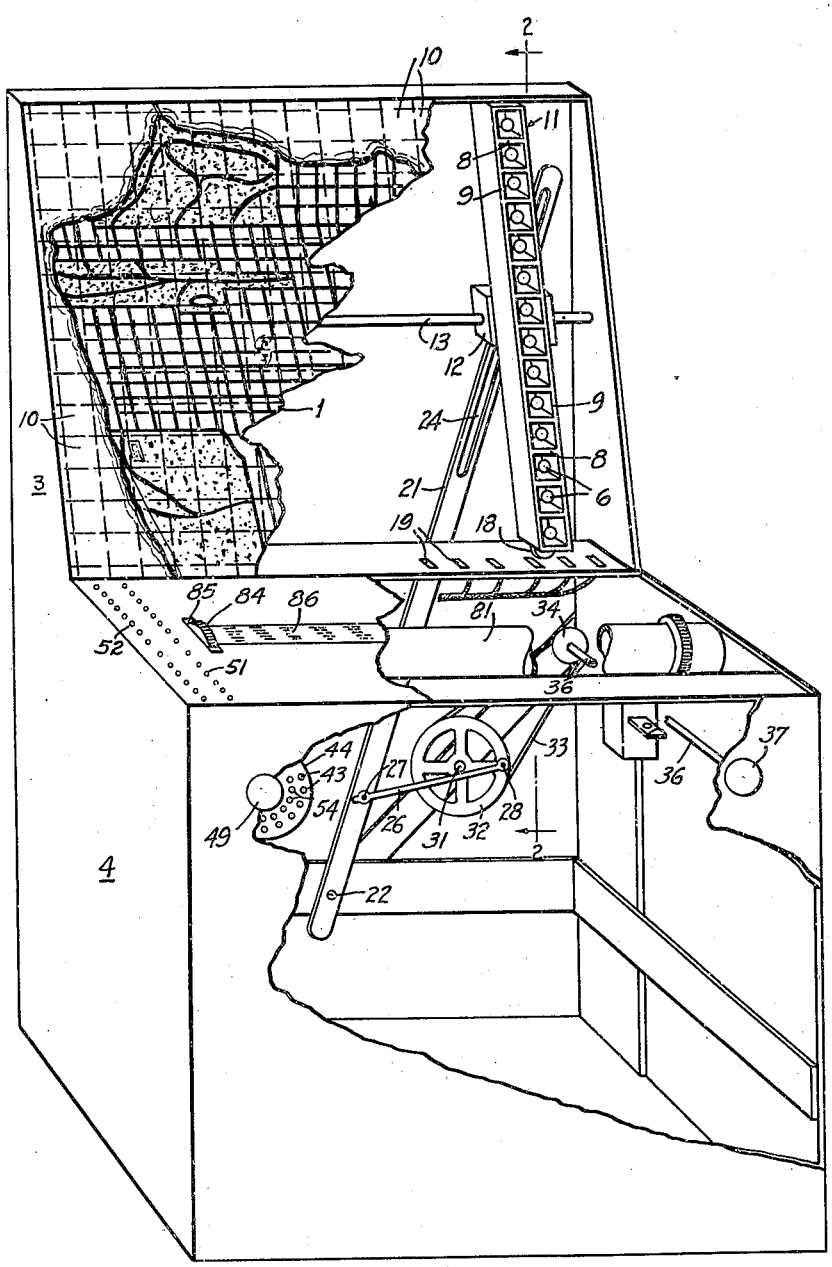
Figure 1 is a perspective view of a map embodying my invention, portions being broken away.
Figure 3:
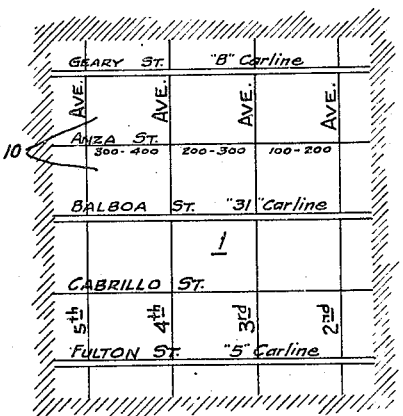
Figure 3 is an enlarged view of a portion of the map illustrating an illuminated area.
Figure 2:
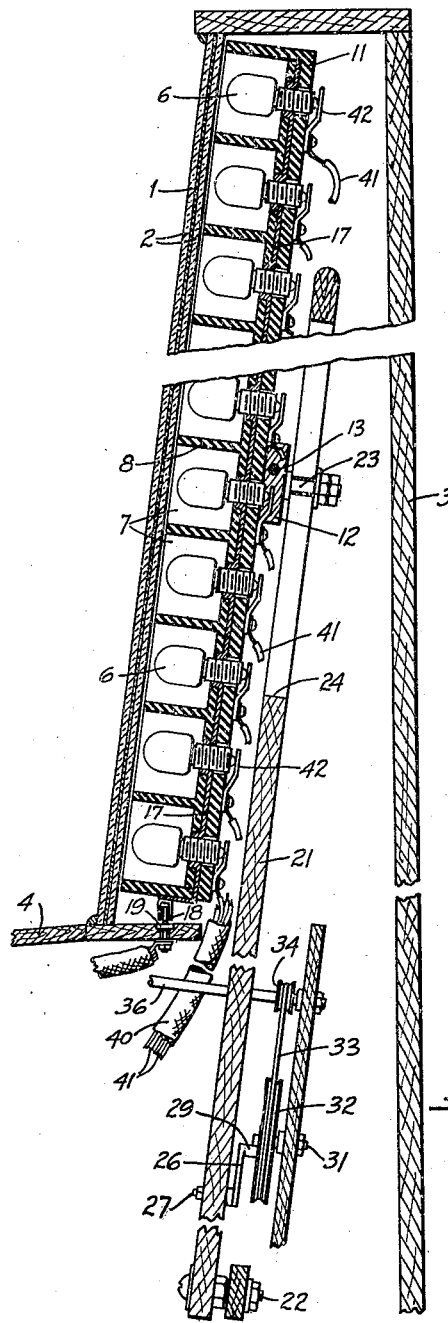
Figure 2 is a fragmental vertical sectional view of portions of the structure shown in Figure 1, the plane in which the section is taken being indicated by the line 2—2 of Figure 1.
Figure 4:
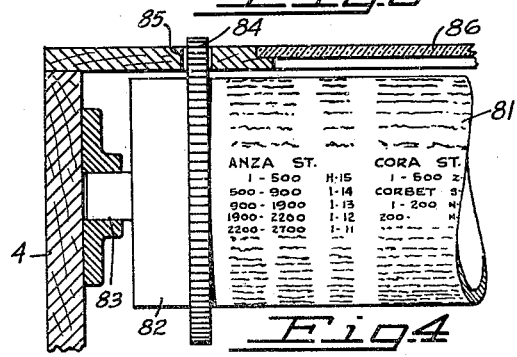
Figure 4 is a fragmental view of a portion of the index roll as mounted within the housing, parts being shown in section.
Figure 5:
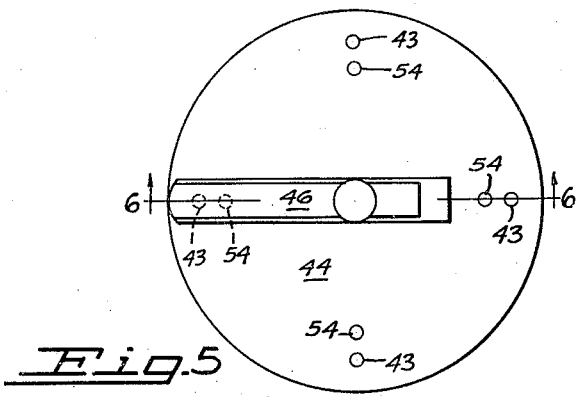
Figure 5 is a plan view of a selector unit.
Figure 6:
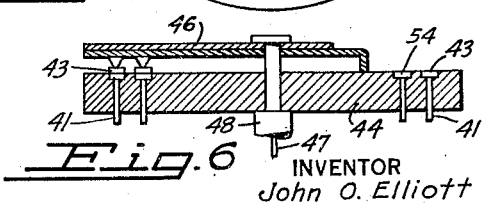
Figure 6 is a section taken upon the line 6—6 of Figure 5.

The plat 1 with its glass covering 2 is mounted upon a suitable housing 3, preferably in a substantially upright position at the back of a supporting base housing 4. Means for illuminating selected areas of the map are mounted within the housing 3 in back of the map 1. Preferably said means comprises a plurality of lighting elements 6 mounted within cells 7 defined by partitions 8 and 9 intersecting at substantially right angles in back of the plat 1. Each cell is of a size defining a unitary map area 10 of appropriate size. The cells may be arranged in rows and columns extending from side to side and from top to bottom throughout the area of the map, with each cell provided with a lighting element for illuminating the overlying area of the map. Because of the large number of connections required in such an arrangement, I prefer an arrangement such as illustrated in Figures 1 and 2 of the drawings, wherein a single column of cells 7 is arranged to be moved to a position in back of any selected column of the unitary areas 10 of the map. In such an arrangement the individual cells of the column are aligned with the rows of unitary areas extending from side to side of the map.

In the illustrated arrangement the cells 7 are joined to form a unitary carrier 11 for the lighting elements 6. A bearing block 12 secured to the backing 11 is mounted for sliding movement along a rod 13 extending from end to end of the housing 3 about midway between the top and bottom of the map. The bearing block 12 is of a length sufficient to prevent binding; and engagement of the carrier with the inner face of the plat 1 or its inner facing plate 2 prevents rotation of the carrier about the rod 13 as an axis. The carrier 11 is so mounted that the forward edges of the partitions 8 and 9 will be only slightly spaced in back of the map so that light from the lighting elements 6 will be confined to the unitary areas 10 of the map immediately overlying the respective elements.

Each of the several lighting elements 6 in the cell of the carrier 11 has one terminal electrically connected to a common lead 17. A suitable contactor 18, which may be a roller, brush, or other suitable movable connector, is connected to the lead 17 and arranged to engage any of a plurality of contacts 19 positioned to correspond to the several columns of unitary areas 10 of the map and the positions of the carrier 11 and cells 7 in back thereof. When the contactor 18 is in engagement with any of the contacts 19, a circuit may be closed through the lead 17 to any of the lighting elements 6 upon the carrier.

The carrier 11, with its cells 7 and lighting elements 6, is arranged to be moved from side to side of the map by means of a lever 21 pivoted upon a pin 22 within the base 4 and slidably and pivotally connected to the carrier 11 by means of a pin 23 engaging a slot 24 in the upper end of the lever. The lever 21 is oscillated by means of a connecting rod 26 having one end pivotally connected to the lever 21 by a pin 27. The other end of the rod 26 is pivotally connected by a pin 28 to a crank 29, rotatable about an axis 31.

As illustrated, the crank 29 is carried by a pulley wheel 32 journaled within the base 4. A belt 33 passes over the pulley 32 and a drive pulley 34 secured upon a shaft 36 journaled within the housing for actuating the crank. The shaft 36 extends outwardly from the base 4 and is provided with actuating means such as a knob 37 by which it may be manually operated for moving the carrier 11 to a selected position in back of the plat 1. When the carrier is moved to a position in back of a desired column of unitary areas 10 of the map, and with the contactor 18 in engagement with the selected contact 19, an electrical connection is effected through the conductor 17 to one terminal of each cell lighting element 6.

Connection to the other terminal of each cell lighting element 6 is made by means of leads 41 soldered or otherwise connected to contacts 42 engaged by the lighting elements 6.

The leads 41 are grouped to form a flexible cable 40 supported by and movable with the actuating lever 21. The leads 41 are separately connected to corresponding contact buttons 43 secured upon a selector disc 44 and arranged to be engaged by a selector arm 46 rotatably mounted upon the disc 44. The arm 46 is movable to engage any selected contact button 43 for effecting a connection through a lead 41 to the corresponding contact 42 and lighting element 6. The arm 46 is electrically connected to a source of electrical energy by a lead 47 for supplying energizing current to the lighting elements 6. The arm 46 is arranged to be actuated manually by a shaft 48 extending outwardly through the base 4 and provided with an actuating knob 49.

A set of indicator lights 51 is provided for indicating the position in which the carrier 11 is set with respect to the columns of areas 10 and the contacts 19 corresponding thereto. Another set of indicator lights 52 is provided for indicating the setting of the arm 46 and the lighting element 6 of the carrier 11 which will be illuminated for a particular setting of the arm. The number of lights 51 and 52 in the respective series correspond respectively to the numbers of unitary areas in the columns and rows into which the map is divided for selective illumination.

Figure 7:
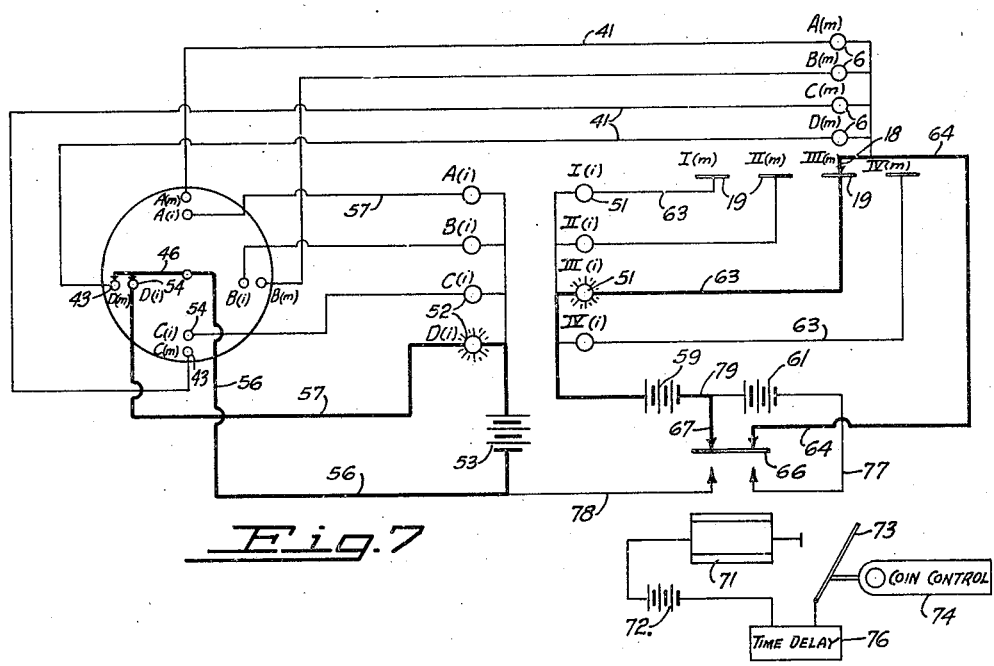
Figure 7 is a wiring diagram showing the manner in which the indicator lights are selectively energized.
Figure 8:
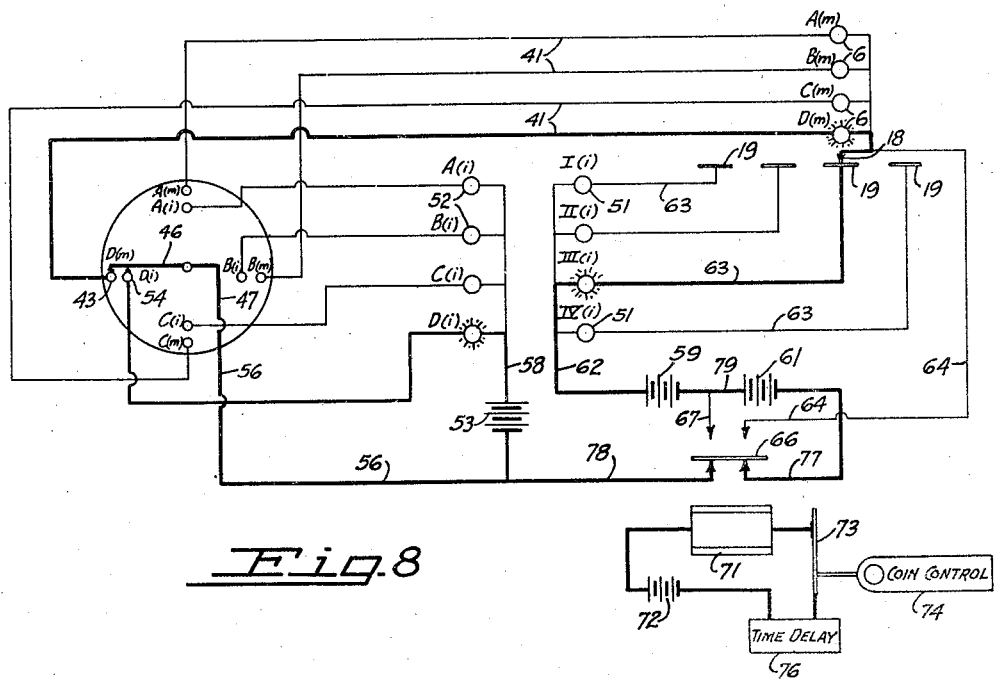
Figure 8 is a similar diagram showing how a selected map light is energized.

For simplicity, in the wiring diagrams of Figures 7 and 8, only four lights are shown in each series of indicator lights. The lights 51, indicating position of the carrier 11 or vertical columns of unitary areas 10 are designated I($i$), II($i$), III($i$), and IV($i$), to correspond to contacts 19 related to map columns I($m$), II($m$), III($m$) and IV($m$). The lights 52 are designated A($i$), B($i$), C($i$) and D($i$) to correspond to map lights 6 which for clarity are designated A($m$), B($m$), C($m$) and D($m$) respectively. The map 1 may of course be divided into any desired number of rows and columns of unitary areas for independent selective illumination and the number of lights 51 and 52 will conform to the number of columns and rows respectively. The electrical connections to additional lights 6, 51 and 52 will correspond to those illustrated in Figures 7 and 8.

The indicator lights 52 are energized from a suitable source of electrical energy 53, such as a battery, or preferably the secondary winding of a transformer designed to supply a six volt current. Current to the lights 52 is supplied through contact buttons 54 engaged by the arm 46 and so positioned that when the arm 46 is moved to engage the contact button 43 connected to a selected light 6, as for example the light D($m$) as shown in Figures 7 and 8, a circuit will be closed through the corresponding indicator light 52 designated D($i$). A connection 56 connects the negative terminal of the battery or transformer 53 to the arm 46; and connections 57 connect the buttons 54 to the corresponding lights 52 which are all connected to the positive pole through a common connection 58.

The indicator lights 51 are energized by current supplied from a battery or 6 volt transformer 59, alone or in series with a second battery or 6 volt transformer 61. For initially indicating the setting of the carrier 11, the lights 51 are connected to the positive terminal of the battery or transformer 59 through a connection 62 common to all the lights. Connections 63 connect the lights to corresponding contacts 19. A connection 64 connects the contactor 18 to a switch arm 66 normally positioned to close a connection to the negative pole of the battery or transformer 59 through a connection 67. The light 51 is energized which corresponds to the contact 19 engaged by the contactor for any particular setting of the carrier.

The map lighting elements 6 of the carrier 11 are energized selectively in accordance with the column setting of the carrier 11 and the row setting of the selector arm 46. The energizing circuit through the selected lighting element 6 is controlled independently of the indicator light circuits, preferably by means of a coin controlled mechanism for closing the circuit for a limited period. One such mechanism is illustrated diagrammatically in Figures 7 and 8 of the drawings and comprises a relay 71 operating in connection with the switch arm 66. The relay 71 is operated by current from a battery or transformer 72 through a circuit controlled by a switch 73. A suitable coin control mechanism 74 is provided for closing the switch 73. Preferably a time delay mechanism 76, which may be either mechanically or electrically operated to open the switch 73 after a predetermined time interval, is also provided. When the switch 73 is closed, the relay 71 is energized and causes the switch arm 66 to be moved to break the circuit through the connections 64 and 67, and to close a circuit through a connection 77 connected to the negative terminal of the battery or transformer 61 and a lead 78 connected to the connection 56. The negative terminal of the battery or transformer 59 is connected to the positive terminal of the battery or transformer 61 by a lead 79.

While the switch arm 66 is in its normal position closing a connection between the connections 64 and 67, movement of the contactor 18 into engagement with any contact 19 will close a circuit through the corresponding indicator light 51, as indicated in heavy lines in Figure 7. At such times, no current is directed through any of the lighting elements 6.

When the switch arm 66 is moved to break the circuit between the connections 64 and 67, and to close the circuit through the connections 77 and 78, the batteries or transformers 59 and 61 operate in series to direct current through the selected indicator light 51 and one of map lighting elements 6, as indicated in heavy lines in Figure 8. The lighting elements 6 are selectively connected to the negative side of the current supply 59 and 61 through the connections 41, contact arm 46, and connections 56, 78 and 77; and are independently energized through the selected connection 41 engaged by the selector arm 46. From the arm 46, current flows to the batteries 59 and 61 through the connections 56, 78 and 77. The indicator light 52 corresponding to the selected map lighting element 6 is energized by current from the battery or transformer 53 as an independent circuit operating concurrently with the circuit through the selected indicator light 51 and map lighting element 6, as indicated in medium heavy lines in Figure 8. After the map lighting circuit has remained closed for a predetermined period of time, say about one minute, the time delay mechanism 76 opens the coin controlled relay switch 73 and the switch arm 66 is returned to its normal position. The specific structure of the coin control and time delay mechanisms is not material to my present invention, and a detailed description of such mechanisms is therefore unnecessary, and is omitted herefrom.

An index designated in general by the numeral 81 is provided for indicating the unitary area of the map in which any particular place is located. The index comprises a web bearing a tabulation of identifiable locations arranged in alphabetical and/or numerical sequence. In the preferred arrangement illustrated in the drawings, the index web is mounted upon a drum 82 journaled within the base housing 4 upon suitable bearings 83. One or more flanges 84 formed upon the drum, preferably adjacent its ends, extend through slots 85 in the top of the base 4, to provide means for turning the drum upon its bearings. A window 86, which may advantageously be made a lens, is provided in the top of the housing through which the index may be observed.

The index is arranged in columns extending around the drum. Streets are listed alphabetically; and, under each street name, groups of blocks corresponding to the unitary areas 10 of the map are listed by the numbers indicated in the block. Buildings may be included by name, or number, or both, at the appropriate places in the index; and other identifiable locations may be similarly indexed.

Associated with each item of the index is provided a designation of the unitary area within which the indexed item is located. For example, the unitary areas 10 may be identified with respect to rows which extend from side to side of the map and columns which extend from top to bottom of the map. The columns may be numbered consecutively from one side to the other and the rows may be identified alphabetically. The position of any unitary area may thus be indicated by a numeral which identifies the column in which it is located, and by a letter indicating the row. The size of the drum, and the number and arrangement of index listings will of course vary to meet the requirements of the locality shown in the map.

When it is desired to find a particular point on the map, the operator turns the index drum 82 to display the desired portion of the index through the window 86, so that the location of the point may be ascertained with respect to the unitary area of the map in which it is contained. For example, assuming the operator wishes to locate a point in the 200 block on Anza Street, the index is turned to show Anza Street; and the row and column position of the 200 block is noted.

Assuming that the block is located in column III and row D, the selector knob 37 is turned to move the carrier 11 to a position in back of column III of the map. As the carrier 11 is moved into alignment with column III of the map, the contactor 18 engages the corresponding contact 19 and closes a circuit through the indicator light 51 which is designated III (i). The selector knob 49 is next turned to move the arm 46 into engagement with the contact button 54 corresponding to row D on the map. When this setting is effected the indicator light 52 designated D(i) will be energized.

The selectors having been set to the desired positions, the switch 73 is closed, whereupon the relay 71 shifts the switch arm 66 to the position indicated in Figure 8 of the drawings. The circuit thus closed causes the lighting element then positioned in back of the area D—III of the map to be illuminated and the desired location displayed.

The map preferably has street car and bus lines, and desired geographic features plotted or suitably indicated so that the observer can ascertain desired information of that character relating to a selected location. In this manner, persons unfamiliar with a mapped territory may readily secure accurate information with regard to the location, surroundings and transportation facilities of any selected place within the bounds of the map.

I claim:

1. A map comprising a plat divided into a plurality of rows and columns of unitary areas each showing the location of identifiable points therein, an index designating by row and column the location of the identifiable points within the several unitary areas, a light carrier having cells corresponding to the unitary cells of a column, means for moving the cells into matching relation with a selected column, a column selector operable to supply current to the lighting elements when positioned in matching relation with a selected column, a row selector operable to supply current to the lighting element of the carrier corresponding to a selected row, and independently operable means for controlling the supply of current through the selectors to a single selected cell lighting element.

2. A map comprising a plat divided into a plurality of rows and columns of unitary areas each showing the location of identifiable points therein, an index designating by row and colunm the location of the identifiable points within the several unitary areas, a light carrier having cells corresponding to the unitary cells of a column, means for moving the cells into matching relation with a selected column, a column selector operable to supply current to the lighting elements when positioned in matching relation with a selected column, a row selector operable to supply current to the lighting element of the carrier corresponding to a selected row, an indicator having lights corresponding to the rows and columns, connections for energizing corresponding indicator lights when the selectors are moved to effect connection with a cell light in a selected position, and independently operable means for controlling the supply of current through the selectors to the cell lighting elements while the selected indicator lights remain energized.

3. In a map having means for selectivly illuminating limited areas positioned in rows and columns extending from side to side and from top to bottom of the map, an indicator having a row of lights corresponding to the rows of such areas, a second row of lights corresponding to columns of such areas, means for energizing the light in each row of indicator lights corresponding to the area of the map selected for illumination, and means for independently illuminating the area corresponding to the energized indicator lights.

4. In a map having means for selectively illuminating limited areas positioned in rows and columns extending from side to side and from top to bottom of the map, an indicator comprising a set of lights corresponding respectively to the rows of areas, a second set of lights corresponding respectively to the columns of areas, selector means for effecting an electric connection to the illuminating means for the area common to a selected row and column, and connections controlled by selector means for energizing the indicator lights corresponding to the selected row and column while the circuit to the illuminating means is broken at a point between the selector means and the illuminating means.

5. In a map having means for selectively illuminating limited areas positioned in rows and columns extending from side to side and from top to bottom of the map, an indicator comprising a set of lights corresponding respectively to the rows of areas, a second set of lights corresponding respectively to the columns of areas, selector means for effecting an electric connection to the illuminating means for the area common to a selected row and column, connections controlled by selector means for energizing the indicator lights corresponding to the selected row and column while the circuit to the illuminating means is broken at a point between the selector means and the illuminating means, and independently operable means for closing the circuit to the illuminating means while the selected indicator lights remain energized.

6. A map comprising a plat of light transmitting material showing locations identifiable with respect to limited areas arranged in rows and columns extending respectively from side to side and from top to bottom of the map, a series of light cells corresponding to a column of the map areas, means for moving the light cells to a position in back of a selected column of areas, lighting elements positioned in the cells, and selector means for closing a circuit through a selected lighting element of the series when the series is in a selected position in back of the map.

7. In a map having means for selectively illuminating limited areas positioned in rows and columns extending from side to side and from top to bottom of the map, selector means for controlling the flow of current to the illuminating means comprising a carrier mounted for movement from side to side of the map in parallel relation to the columns of areas, partitions dividing the carrier into cells corresponding to the rows of areas, lighting elements in the cells, a set of contacts positioned for engagement by the carrier when the carrier is moved into alignment with corresponding columns of areas, a second set of contacts connected for controlling the flow of current to the lighting elements, and means operable in connection with said second set of contacts for selectively energizing the lighting element corresponding to a selected row.

JOHN O. ELLIOTT.

REFERENCES CITED

The following references are of record in the file of this patent:

UNITED STATES PATENTS

| Number | Name | Date |
|---|---|---|
| 876,701 | Drewell | Jan. 14, 1908 |
| 1,867,048 | Abel | July 12, 1932 |
| 1,960,781 | Hershey | May 29, 1934 |
| 2,282,164 | Buswell | May 5, 1942 |
| 2,417,043 | Blewett et al. | Mar. 11, 1947 |

FOREIGN PATENTS

| Number | Country | Date |
|---|---|---|
| 515,930 | Great Britain | Dec. 18, 1939 |